(12) United States Patent
Schoenek et al.

(10) Patent No.: US 9,772,028 B2
(45) Date of Patent: Sep. 26, 2017

(54) HYBRID TRANSMISSION ARRANGEMENT HAVING A MOTOR DAMPER

(71) Applicant: GM Global Technology Operations LLC, Detroit, MI (US)

(72) Inventors: Norman Schoenek, Novi, MI (US);
Shawn H. Swales, Canton, MI (US);
Min-Joong Kim, Troy, MI (US);
Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 170 days.

(21) Appl. No.: 14/828,054

(22) Filed: Aug. 17, 2015

(65) Prior Publication Data
US 2015/0354671 A1   Dec. 10, 2015

Related U.S. Application Data

(63) Continuation of application No. 13/325,878, filed on Dec. 14, 2011, now Pat. No. 9,121,492.
(Continued)

(51) Int. Cl.
*F16H 57/04* (2010.01)
*B60K 6/48* (2007.10)
(Continued)

(52) U.S. Cl.
CPC ........... *F16H 57/0476* (2013.01); *B60K 6/48* (2013.01); *F16H 3/66* (2013.01); *F16H 57/0484* (2013.01); *H02K 7/006* (2013.01); *B60K 2006/4825* (2013.01); *F16H 2200/0052* (2013.01); *F16H 2200/201* (2013.01);
(Continued)

(58) Field of Classification Search
None
See application file for complete search history.

(56) References Cited

U.S. PATENT DOCUMENTS 6,558,287 B2   5/2003   Hayabuchi et al.
6,634,981 B1   10/2003   Raghavan et al.
(Continued)

FOREIGN PATENT DOCUMENTS

DE   WO 2009077363 A1 *   6/2009   ............... F16H 3/66

*Primary Examiner* — Erin D Bishop

(57) ABSTRACT

An electric motor damping module includes an electric motor, a motor damper continuously interconnected with the electric motor, and an input member continuously interconnected with the motor damper. A transmission includes these elements, plus an output member, first, second, and third planetary gear sets each having first, second and third members, a first interconnecting member continuously interconnecting the third member of the first planetary gear set with the second member of the second planetary gear set, a second interconnecting member continuously interconnecting the second member of the first planetary gear set and the output member with the third member of the third planetary gear set, and a third interconnecting member continuously interconnecting the third member of the second planetary gear set with the second member of the third planetary gear set. The transmission also includes six torque transmitting mechanisms and a hydraulic pump. A sealing assembly is also provided.

17 Claims, 3 Drawing Sheets

Related U.S. Application Data

(60) Provisional application No. 61/432,179, filed on Jan. 12, 2011.

(51) Int. Cl.
  *F16H 3/66* (2006.01)
  *H02K 7/00* (2006.01)

(52) U.S. Cl.
  CPC ............... *F16H 2200/2043* (2013.01); *F16H 2200/2046* (2013.01); *F16H 2200/2082* (2013.01); *Y02T 10/6221* (2013.01); *Y02T 10/6252* (2013.01); *Y10S 903/911* (2013.01)

(56) References Cited

U.S. PATENT DOCUMENTS

| | | |
|---|---|---|
| 6,648,790 B2 | 11/2003 | Raghavan et al. |
| 6,659,903 B1 | 12/2003 | Bucknor et al. |
| 6,659,904 B1 | 12/2003 | Usoro et al. |
| 6,672,988 B1 | 1/2004 | Raghavan et al. |
| 6,709,360 B2 | 3/2004 | Raghavan et al. |
| 6,746,360 B2 | 6/2004 | Bucknor et al. |
| 6,752,738 B1 | 6/2004 | Martin et al. |
| 6,860,831 B2 | 3/2005 | Ziemer |
| 6,887,178 B2 | 5/2005 | Miyazaki et al. |
| 6,910,985 B2 | 6/2005 | Ishimaru et al. |
| 6,910,986 B2 | 6/2005 | Wittkopp |
| 6,945,900 B2 | 9/2005 | Usoro et al. |
| 6,949,048 B2 | 9/2005 | Bucknor et al. |
| 6,962,548 B2 | 11/2005 | Bucknor et al. |
| 6,976,931 B2 | 12/2005 | Raghavan et al. |
| 6,988,972 B2 | 1/2006 | Usoro et al. |
| 6,991,577 B2 | 1/2006 | Usoro et al. |
| 6,994,649 B2 | 2/2006 | Raghavan et al. |
| 6,997,844 B2 | 2/2006 | Bucknor et al. |
| 6,997,846 B2 | 2/2006 | Bucknor et al. |
| 7,001,304 B2 | 2/2006 | Raghavan et al. |
| 7,004,880 B2 | 2/2006 | Bucknor et al. |
| 7,014,590 B2 | 3/2006 | Stevenson |
| 7,029,416 B2 | 4/2006 | Miyazaki et al. |
| 7,033,299 B2 | 4/2006 | Bucknor et al. |
| 7,037,232 B2 | 5/2006 | Ishimaru |
| 7,041,027 B2 | 5/2006 | Bucknor et al. |
| 7,056,257 B2 | 6/2006 | Usoro et al. |
| 7,056,258 B2 | 6/2006 | Bucknor et al. |
| 7,059,994 B2 | 6/2006 | Usoro et al. |
| 7,059,995 B2 | 6/2006 | Stevenson |
| 7,066,861 B2 | 6/2006 | Bucknor et al. |
| 7,074,152 B2 | 7/2006 | Raghavan et al. |
| 7,074,153 B2 | 7/2006 | Usoro et al. |
| 7,081,066 B2 | 7/2006 | Raghavan et al. |
| 7,086,986 B2 | 8/2006 | Raghavan et al. |
| 7,090,610 B2 | 8/2006 | Usoro et al. |
| 7,094,173 B2 | 8/2006 | Raghavan et al. |
| 7,101,303 B2 | 9/2006 | Tiesler et al. |
| 7,104,914 B2 | 9/2006 | Bucknor et al. |
| 7,104,915 B2 | 9/2006 | Tiesler et al. |
| 7,104,916 B2 | 9/2006 | Usoro et al. |
| 7,108,627 B2 | 9/2006 | Bucknor et al. |
| 7,115,061 B2 | 10/2006 | Tiesler et al. |
| 7,115,062 B2 | 10/2006 | Klemen |
| 7,115,063 B2 | 10/2006 | Tiesler et al. |
| 7,118,509 B2 | 10/2006 | Tabata et al. |
| 7,118,510 B2 | 10/2006 | Raghavan et al. |
| 7,118,511 B2 | 10/2006 | Tiesler et al. |
| 7,128,684 B2 | 10/2006 | Raghavan et al. |
| 7,131,926 B2 | 11/2006 | Tiesler et al. |
| 7,137,923 B2 | 11/2006 | Tiesler et al. |
| 7,140,996 B2 | 11/2006 | Tiesler et al. |
| 7,150,695 B2 | 12/2006 | Usoro et al. |
| 7,150,696 B2 | 12/2006 | Bucknor et al. |
| 7,153,231 B2 | 12/2006 | Usoro et al. |
| 7,156,767 B2 | 1/2007 | Tiesler et al. |
| 7,156,768 B2 | 1/2007 | Gumpoltsberger |
| 7,166,053 B2 | 1/2007 | Bucknor et al. |
| 7,220,210 B2 | 5/2007 | Soh |
| 7,247,119 B2 | 7/2007 | Andres |
| 7,247,120 B2 | 7/2007 | Raghavan et al. |
| 7,250,019 B2 | 7/2007 | Bucknor et al. |
| 7,261,666 B2 | 8/2007 | Usoro et al. |
| 7,282,007 B2 | 10/2007 | Ishimaru |
| 7,303,501 B2 | 12/2007 | Raghavan et al. |
| 7,753,149 B2 | 7/2010 | Tabata et al. |
| 8,152,670 B2 | 4/2012 | Kuzuya et al. |
| 8,465,390 B2 | 6/2013 | Brehmer et al. |
| 8,574,114 B2 | 11/2013 | Brehmer et al. |
| 8,663,055 B2 | 3/2014 | Brehmer et al. |
| 2006/0108162 A1* | 5/2006 | Tabata .................. B60K 6/26 180/65.23 |
| 2008/0039285 A1* | 2/2008 | Park .................. F16H 3/66 477/116 |
| 2010/0179010 A1* | 7/2010 | Kuzuya .................. B60K 6/445 475/5 |

\* cited by examiner

HYBRID TRANSMISSION ARRANGEMENT HAVING A MOTOR DAMPER

CROSS-REFERENCE TO RELATED APPLICATIONS

This application claims the benefit of U.S. application Ser. No. 13/325,878 filed on Dec. 14, 2011 and U.S. Provisional Application No. 61/432,179 filed on Jan. 12, 2011, which are herein incorporated by reference in their entirety.

FIELD

The present disclosure relates to a hybrid powertrain and more particularly to an arrangement for coupling an electric motor to an automatic transmission.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, however, as such constraints as axial length, housing outside diameter, clutch actuation, clutch cooling and integration into the existing powertrain components must be addressed and resolved.

The present invention is directed to a hybrid powertrain which addresses and solves the above-delineated challenges.

SUMMARY

In one variation, a transmission is provided that includes an input member, an output member, first, second, and third planetary gear sets each having first, second and third members, at least six torque transmitting mechanisms, a hydraulic pump for providing a supply of pressurized hydraulic fluid to the transmission, an electric motor, a motor damper, and at least three interconnecting members. The first interconnecting member continuously interconnects the third member of the first planetary gear set with the second member of the second planetary gear set. The second interconnecting member continuously interconnects the second member of the first planetary gear set and the output member with the third member of the third planetary gear set. The third interconnecting member continuously interconnects the third member of the second planetary gear set with the second member of the third planetary gear set. The six torque transmitting mechanisms are selectively engageable to interconnect at least one of the first, second, and third members with at least another of the first, second, third members and a stationary transmission case member. The electric motor is continuously interconnected with the motor damper and with the first member of the second planetary gear set. The hydraulic pump is continuously interconnected with the first member of the second planetary gear set. The transmission also has a bell housing surrounding the electric motor and a sealing assembly including a seal and an end plate. The sealing assembly, the bell housing, and the transmission case member cooperate to define a sealed chamber in which the electric motor is sealed. The torque transmitting mechanisms are selectively engageable to establish a plurality of forward speed ratios and at least one reverse speed ratio between the input member and the output member.

In another variation, which could be combined or distinct from the previous or subsequent variation, an electric motor damping module for use with a transmission is provided. The electric motor module includes an electric motor, a motor damper, an input member for inputting torque to a transmission, a bell housing, and a sealing assembly. The motor damper is continuously interconnected with the electric motor, and the motor damper is continuously interconnected with the input member. The bell housing surrounds the electric motor. The sealing assembly including a seal and an end plate, and the sealing assembly, the bell housing, and a transmission case member cooperate to define a sealed chamber. The electric motor is sealed within the sealed chamber to allow the electric motor to be cooled by a hydraulic fluid.

In yet another variation, which could be combined or distinct from the previous variations, an electric motor damping module for use with a transmission is provided. The electric motor damping module includes a bell housing forming an interior space, an electric motor having a stator and a rotor, a sealing assembly, and a motor damper. The electric motor is located in the interior space of the bell housing, in this embodiment. The sealing assembly has a seal and an end plate and cooperates with the bell housing and transmission case to seal the electric motor inside the interior space of the bell housing. The motor damper is continuously interconnected with the electric motor.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
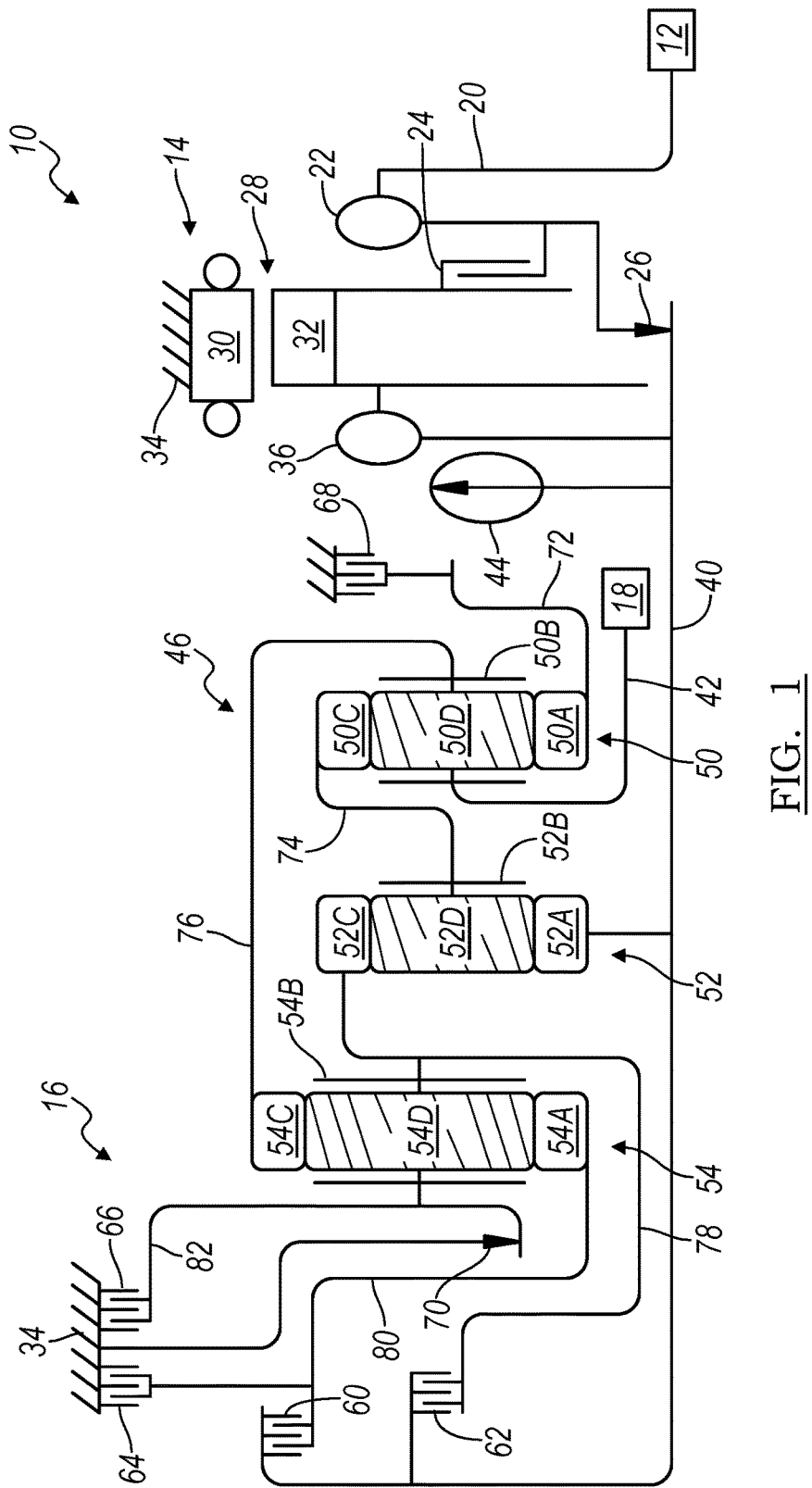
FIG. 1 is diagrammatic view of an embodiment of a hybrid powertrain including a six speed transmission, in accordance with an embodiment of the invention.

With reference to FIG. 1, an exemplary powertrain for a motor vehicle is generally indicated by reference number 10. The powertrain 10 includes an engine 12 and an electric motor module 14 that supplies a driving torque to a transmission 16 which supplies various gear or speed ratios to a final drive unit 18. The engine 12 may be a conventional internal combustion engine or an electric engine, or any other type of prime mover, without departing from the scope of the present disclosure. The engine 12 supplies a driving torque to a flexplate or other connecting device 20.

In the illustrated embodiment, the flexplate 20 is coupled to the electric motor module 14 via an engine damper 22 and a disconnect clutch 24. The flexplate 20 is further connected to a transmission input member 40 via a one-way clutch 26. It should be understood that other connecting arrangement could exist without falling beyond the spirit and scope of the present disclosure; for example, in some variations, the one-way clutch 26 could be eliminated, depending on factors such as internal combustion engine capability, packaging space, and spin loss trade off. In the illustration, the one-way clutch 26 is a torque transmitting mechanism that is selectively engageable to interconnect the flywheel and the engine 12 output with the input member 40 and the first member 52A of the second planetary gear set 52.

The electric motor module 14 includes an electric motor 28 having a stator 30 and a rotor 32. A second damper, or motor damper 36, interconnects the electric motor 28 with the input member 40 and the first member (sun gear 52A) of the second planetary gear set 52.

The first damper, or engine damper 22 (connected to the flexplate 20), is configured to absorb a portion of torque oscillations transmitted through the flexplate 20 from the engine 12. The engine damper 22 may take various forms and have various properties without departing from the scope of the present disclosure, for example, the engine damper 22 and flexplate 20 may be combined to form a dual mass flywheel. In the present illustration, the engine damper 22 is connected to both the disconnect clutch 24 and to the one-way clutch 26. The engine damper 22 is continuously interconnected with the engine 12 output and flywheel, and the engine damper 22 is selectively engageable with the input member 40 via the clutch 22 and/or the one-way clutch 26.

The disconnect clutch 24 is, in the example provided, a plate clutch that when applied transmits torque from the first damper 22 to the electric motor 28. However, it should be appreciated that various types of torque transmitting devices may be employed. The electric motor 28 generally includes a stator 30 and a rotor 32. The stator 30 includes a plurality of windings or phases and is secured to a ground, stationary member, or a transmission housing 34. The rotor 32 includes a plurality of magnets and/or ferromagnetic members and is disposed radially inwardly of the stator 30 and is interconnected for common rotation with the disconnect clutch 24 and a second damper 36. The stator 30 and the rotor 32 may take various forms and have various properties without departing from the scope of the present disclosure.

The motor damper 36 is configured to absorb a portion of torque oscillations transmitted from the rotor 32 of the electric motor 28. The motor damper 36 may take various forms and have various properties without departing from the scope of the present disclosure. The motor damper 36 and the engine damper 22 act independently. They may act based on two different sets of functions at different times.

The transmission 16 generally includes a transmission input shaft 40, a transmission output shaft 42, a pump 44, and a clutch and gear arrangement 46. The transmission input shaft 40 is connected for common rotation with and is selectively driven by both the one-way clutch 26 and the engine damper 36. In addition, the pump 44 is connected to and driven by the transmission input shaft 40. The pump 44 may be any positive displacement pump, such as a gerotor pump or a vane pump, operable to provide pressurized hydraulic fluid to both the transmission 16 and the electric motor module 14.

The gear and clutch arrangement 46 includes a plurality of planetary gear assemblies 50, 52, and 54 interconnected with a plurality of torque transmitting mechanisms 60, 62, 64, 66, 68, and 70. For example, the first planetary gear set 50 includes a sun gear member 50A, a planet gear carrier member 50B and a ring gear member 50C. The ring gear member 50C is connected for common rotation with a first shaft or interconnecting member 74. The planet gear carrier member 50B rotatably supports a set of planet gears 50D (only one of which is shown) and is connected for common rotation with the transmission output shaft or member 42 and a second shaft or interconnecting member 76. The planet gears 50D are each configured to intermesh with both the sun gear member 50A and the ring gear member 50C. The sun gear member 50A is connected for common rotation with a third shaft or interconnecting member 72.

The second planetary gear set 52 includes a sun gear member 52A, a planet carrier member 52B that rotatably supports a set of planet gears 52D and a ring gear member 52C. The sun gear member 52A is connected for common rotation with the transmission input shaft or member 40. The ring gear member 52C is connected for common rotation with a fourth shaft or interconnecting member 78. The planet carrier member 52C is connected for common rotation with the first shaft or interconnecting member 74. The planet gears 52D are each configured to intermesh with both the sun gear member 52A and the ring gear member 52C.

The third planetary gear set 54 includes a sun gear member 54A, a ring gear member 54C and a planet carrier member 54B that rotatably supports a set of planet gears 54D. The sun gear member 54A is connected for common rotation with a fifth shaft or interconnecting member 80. The ring gear member 54C is connected for common rotation with the second shaft or interconnecting member 76. The planet carrier member 54B is connected for common rotation with the fourth shaft or interconnecting member 78 and a sixth shaft or interconnecting member 82. The planet gears 54D are each configured to intermesh with both the sun gear member 54A and the ring gear member 54C.

The torque-transmitting mechanisms or clutches 60, 62 and brakes 64, 66, 68, 70 allow for selective interconnection of the shafts or interconnecting members, members of the planetary gear sets and the transmission housing. For example, the first clutch 60 is selectively engageable to connect the fifth interconnecting member 80 with the transmission input member 40. The second clutch 62 is selectively engageable to connect the fourth interconnecting member 78 with the transmission input member 40. The first brake 64 is selectively engageable to connect the fifth interconnecting member 80 to the stationary member or transmission housing 34 in order to restrict the member 80 from rotating relative to the stationary member or transmission housing 34. The second brake 66 is selectively engageable to connect the sixth interconnecting member 82 to the stationary member or transmission housing 34 in order to restrict the member 82 from rotating relative to the stationary member or transmission housing 34. The third brake 68 is selectively engageable to connect the third interconnecting member 72 to the stationary member or transmission housing 34 in order to restrict the third interconnecting member 72 from rotating relative to the stationary member or transmission housing 34. The fourth brake 70 is a one-way clutch that is selectively engageable to connect the sixth interconnecting member 82 to the stationary member or transmission housing 34 in order to restrict the sixth interconnecting member 82 from rotating relative to the stationary element or transmission housing 34 in a first rotational direction.

The transmission output shaft or member 42 is preferably continuously connected with the final drive unit or transfer case 18. The final drive unit 18 may include a differential, trans-axles, and wheels (not shown) for providing a final output torque.

Thus, torque selectively flows to and from the engine 12 at the transmission input member 40 through the clutch 26. Torque continuously flows from the electric motor 28 to the transmission input member, but may be selectively disconnected from the transmission output 18 via the neutral idle brake 68. In other words, if the brake 68 is allowed to slip, the sun gear 50A will spin and no torque will be transferred through the carrier 50B to the output member 18 via the connecting member 42. Torque from the engine 12 input and the electric motor 28 may act in parallel with torque from the electric motor 28 and automatically disengages using the one-way clutch 26. Electric-only operation using all available gear ratios may be employed. A transmission input speed sensor may be used as an electric motor resolver, if desired.

Figure 2:
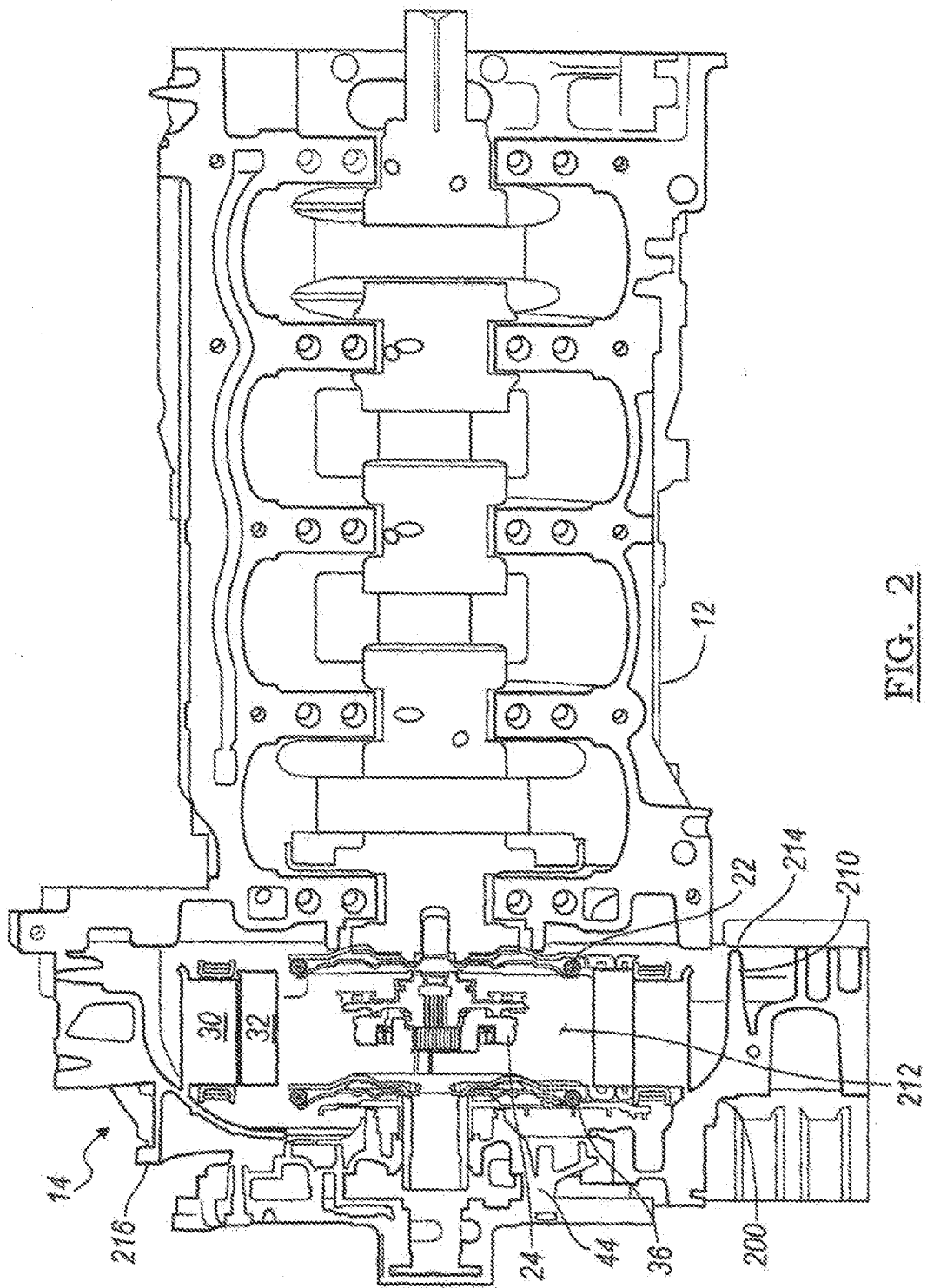
FIG. 2 is a cross-sectional view of an electric motor damping module attached to an engine, in accordance with an embodiment of the invention.

Referring now to FIG. 2, the engine 12 is illustrated assembled to the electric motor module 14. A bell housing 200 is attached to the engine 12. The electric motor module 14, including at least the motor stator 30 and the motor rotor 32 is located entirely within the outer wall 210 of the bell housing 200. In other words, the bell housing 200 has a curved outer wall 210 that forms the bell housing 200 into the shape of a bell (or another shape), and the outer wall 210 defines an interior space 212 within the bell housing 200. The engine damper 22 and the motor damper 36 are also located in the interior space 212 formed by the outer wall 210 of the bell housing 200. As such, in this variation, the electric motor 28, the engine damper 22, and the motor damper 36 are arranged in a spatial relationship that allows each of them to simultaneously fit in the interior space 212 of the bell housing 200.

The hydraulic pump 44 is at least partially located in the interior space 212 formed by the wall 210 of the bell housing 200, in this embodiment. Accordingly, when the engine 12 and a transmission 16 (not shown in FIG. 2) are attached to each side 214, 216 of the bell housing 200 respectively, the electric motor 28 and each of the dampers 22, 36 are located entirely inside the bell housing 200, and the hydraulic pump 44 is located within the bell housing 200 entirely or entirely within a combination of both the bell housing 200 and the transmission case. The bell housing 200 was designed for a standard torque converter (not shown) and as illustrated provides packaging space for the electric motor module 14.

Figure 3:
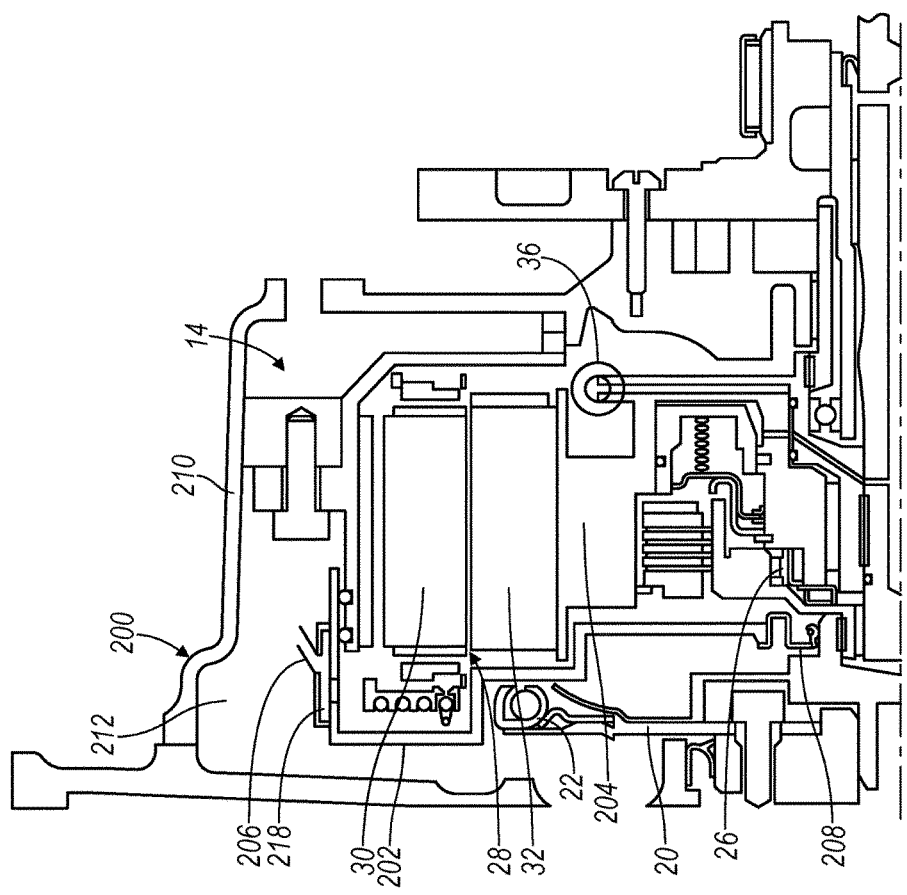
FIG. 3 is a cross-sectional view of a portion of an electric motor damping module, in accordance with an embodiment of the invention.

Referring now to FIG. 3, an upper portion of a bell housing 200 is illustrated containing the electric motor module 14 within the interior space 212 defined by the wall 210 of the bell housing 200. In this variation, the electric motor module 14 having an electric motor 28 including stator 30 and rotor 32 is sealed within the bell housing 200 using a seal assembly and a portion of the transmission case 34. In this embodiment, the seal assembly includes a cylindrical cover 202 and a seal 208, however, other variations of the seal assembly could be used without falling beyond the spirit and scope of the present disclosure.

The seal assembly, including the cover 202 and seal 208, cooperates with the bell housing 200 and a portion of the transmission case 34, or a member connected thereto, to form a sealed chamber 204 within the interior of the bell housing 200. The pump 44 may also form an edge of the sealed chamber 204, in some embodiments. In other embodiments, the pump 44 is the transmission case member 34 that cooperates with the bell housing 200 and the sealing assembly to form the sealed chamber.

The electric motor 28, including the stator 30 and rotor 32, and the motor damper 36 are located within the sealed chamber 204. The sealed chamber 204 provides a place to cool the stator 30 and lubricate the rotor 32 and other components. Hydraulic fluid is fed to the sealed chamber 204 through a feed tube 206 and into a circumferential cooling oil distribution plenum 218. From there, the hydraulic fluid enters the sealed chamber 204 and cools the electric motor 28.

Accordingly, the motor damper 14 is a wet damper because it is located in the lubricated sealed chamber 204, while the engine damper 22 is a dry damper because it is located outside the wet sealed chamber 204. However, in the alternative, it should be understood that either damper 22, 36 could be located inside or outside of the sealed chamber 204.

In a variation, the motor damper 36 is replaced with a different stiffness altering component, such as a flexible coupling, that is configured to operable to alter the stiffness or damping of the connection between the motor 32 and the input member 40. In other words, dampening of the motor 28 is implemented by selection of the features (such as stiffness) of the connecting members between the motor 28 and the first member 52A of the second planetary set 52. As such, the damper 36 of FIG. 1 is eliminated and replaced with a stiffness altering component other than a damper.

In this variation, or in another variation, the engine damper 22 could be located in the wet sealed chamber 204. A flywheel may be connected to the engine 12 output, and a flexplate may be connected to the flywheel. Therefore, the disconnect clutch 24 may selectively interconnect the flywheel with the input member 40, and the engine damper 22 may continuously interconnect the flywheel and the flexplate to the disconnect clutch 24. The sealing assembly, the bell housing 200, the transmission case member 34, and the hydraulic pump 44 may cooperate to seal the engine damper 22 within the interior space 212 of the bell housing 200, resulting in the engine damper 22 being a wet damper.

With reference to Table 1 below, the operation of the disconnect clutch 24 and the one-way clutch 26 during different vehicle operating conditions or maneuvers is illustrated. Column 100 lists the vehicle operating condition or maneuver. Column 102 shows the engagement of disconnect clutch 24 indicated by the presence of an "x" in a corresponding vehicle operating condition or maneuver. Column 104 shows the engagement of one-way clutch 26 indicated by the presence of an "x" in a corresponding vehicle operating condition or maneuver. Column 106 describes the torque transfer between the various components of the electric motor module 14 and the engine 12 and transmission 16.

TABLE 1

| 100 - Maneuver | 102 - Clutch 24 | 104 - One-way Clutch 26 | Comments - 106 |
|---|---|---|---|
| Idle engine off | | | Electric motor 28 spins pump 44 enabling hydraulics while brake 66 is held and brake 68 slips (NI in drive gears) or clutch 60 slips (NI in reverse gear). Brake 66 is held in order to provide better/faster garage shifts. |
| EV launch (fwd & rev) | | | Idle as described above, then as the slipping clutches engage, electrical energy adds to maintain constant or scheduled input speed. |
| EV drive (fwd & rev) | | | Electric motor 28 replaces engine as power source for transmission in general; transmission functions/shifts as normal. |
| EV → engine on | X | | Add electrical energy as disconnect clutch 24 engages to maintain constant or scheduled input speed thereby minimizing output disturbance. Engine starts and adds to input torque using disconnect clutch 24, one-way clutch 26, or both. |
| Parallel hybrid | X | X | Engine and electric motor 28 combined provide input torque using disconnect clutch 24, one-way clutch 26, direct connect or all. |
| Engine on → launch | X | X | Electric motor 28 starts engine either before or during launch, engine then provides torque using disconnect clutch 24, one-way clutch 26, or both. |
| Engine on → EV | | | Electric motor 28 provides driving energy when one-way clutch 26 disengages as engine speed drops below input speed due to fuel cut off. |
| Key start | X | | With transmission in park or neutral, the electric motor 28 spins the main pump 44 enabling hydraulics, which then allow the disconnect clutch 24 to engage and start the engine. |
| Engine start on grade | X | | Add electrical energy as disconnect clutch 24 engages to maintain constant or scheduled input speed thereby minimizing output disturbance or stop vehicle and start engine. |
| Regen | | | Electric motor 28 is directly connected to input, consequently regen in all gear states. |
| Coast braking | X | | Regen, engine braking independently selectable. |

The description of the invention is merely exemplary in nature and variations that do not depart from the gist of the invention are intended to be within the scope of the invention. Such variations are not to be regarded as a departure from the spirit and scope of the invention.

We claim:

1. A transmission comprising:
an input member;
an output member;
first, second, and third planetary gear sets each having first, second and third members;
three interconnecting members continuously interconnecting one of the first, second, and third member of the first, second, and third planetary gear sets with another of the first, second, and third member of the first, second, and third planetary gear sets;
six torque transmitting mechanisms each selectively engageable to interconnect at least one of the first, second, and third members of the first, second, and third planetary gear sets with at least another of the first, second, third members of the first, second, and third planetary gear sets or a stationary transmission case member;
an electric motor and damper module having an input member and output member, and wherein the output member of the electric motor and damper module is continuously interconnected with the input member of the transmission, the electric motor and damper module having:
an electric motor having a stator and a rotor;
an electric motor damper having an input and output, the input of the electric motor damper is continuously interconnected with the rotor of the electric motor and the output of the electric motor damper is continuously connected with the output member of the electric motor and damping module;
a one-way clutch having an input and an output, and wherein the input of the one-way clutch is continuously interconnected with the input member of the damping module and the output of the one-way clutch is continuously interconnected with the output member of the damping module; and
a disconnect clutch having an input and output, and wherein the input of the disconnect clutch is continuously interconnected with the input member of the electric motor and damper module, the output of the disconnect clutch is continuously interconnected with the rotor, and the disconnect clutch is selectively engageable to interconnect an output of an engine damper to the rotor of the electric motor and damper module;
a sealing assembly partially defining a sealed chamber containing hydraulic fluid in which is disposed the electric motor and the electric motor damper to allow the electric motor to be cooled by the hydraulic fluid,
wherein the torque transmitting mechanisms are selectively engageable to establish a plurality of forward speed ratios and at least one reverse speed ratio between the input member and the output member.

2. The transmission of claim 1 wherein a first of the three interconnecting members continuously interconnects the third member of the first planetary gear set with the second member of the second planetary gear set, a second of the three interconnecting members continuously interconnects the second member of the first planetary gear set and the output member with the third member of the third planetary gear set, and a third of the three interconnecting members continuously interconnects the third member of the second planetary gear set with the second member of the third planetary gear set.

3. The transmission of claim 1 wherein a first of the six torque transmitting mechanisms is selectively engageable to interconnect the first member of the second planetary gear set with the first member of the third planetary gear set, a second of the six torque transmitting mechanisms is selectively engageable to interconnect the first member of the second planetary gear set with the third member of the second planetary gear set and the second member of the third planetary gear set, a third of the six torque transmitting mechanisms is selectively engageable to interconnect the first member of the third planetary gear set with the stationary transmission case member, a fourth of the six torque transmitting mechanisms is selectively engageable to interconnect the third member of the second planetary gear set and the second member of the third planetary gear set with the stationary member, a fifth of the six torque transmitting mechanisms is selectively engageable to interconnect the first member of the first planetary gear set with the stationary transmission case member, and a sixth of the six torque transmitting mechanism is selectively engageable to interconnect the third member of the second planetary gear set and the second member of the third planetary gear set with the stationary transmission case member.

4. The transmission of claim 1 further including a hydraulic pump for providing a supply of the pressurized hydraulic fluid to the transmission, and wherein the hydraulic pump includes an input member that is continuously interconnected with the first member of the second planetary gear set.

5. The transmission of claim 1 wherein the sealing assembly includes a seal and an end plate, the sealing assembly, a bell housing, and a transmission case member cooperate to define the sealed chamber, and the electric motor and damper module being sealed within the sealed chamber.

6. The transmission of claim 1 wherein the engine damper has an input, and the input of the engine damper is continuously interconnected with a flexplate connected to an engine output.

7. The transmission of claim 1 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

8. An assembly for use with a transmission, the assembly comprising:
   an input member;
   an output member;
   an electric motor having a stator and a rotor;
   a bell housing surrounding the electric motor, and wherein the stator of the electric motor is fixed to the bell housing;
   an electric motor damper having an input and output, the input of the electric motor damper is continuously interconnected with the rotor of the electric motor and the output of the electric motor damper is continuously connected with the output member of the electric motor and damping module;
   a disconnect clutch having an input and an output, and wherein the input of the disconnect clutch is continuously interconnected with the input member of the electric motor and damping module and the output of the disconnect clutch is continuously interconnected with the rotor;
   a one-way clutch having an input and an output, and wherein the input of the one-way clutch is continuously interconnected with the input member of the electric motor and damping module and the output of the one-way clutch is continuously interconnected with the output member of the electric motor and damping module; and
   a sealing assembly having a seal and an end plate, and wherein the sealing assembly, the bell housing, and a transmission case member cooperate to define a sealed chamber, and the electric motor, the disconnect clutch, and the electric motor damper being sealed within the sealed chamber to allow the electric motor to be cooled by a hydraulic fluid.

9. The electric motor and damping module of claim 8 further comprising an engine damper having an input and an output, and wherein the input of the engine damper is continuously interconnected with an engine output and the output of the engine damper is continuously interconnected with the input of the damping module.

10. The electric motor and damping module of claim 9 wherein the electric motor, the engine damper, and the motor damper are disposed inside the bell housing.

11. The electric motor and damping module of claim 8 further comprising a hydraulic pump having an input member, and wherein the input member of the hydraulic pump is continuously interconnected with the output member of the damping module.

12. The electric motor and damping module of claim 11 wherein the end plate of the sealing assembly includes a circumferential cooling oil distribution plenum for receiving the hydraulic fluid from the hydraulic pump and communicating the the hydraulic fluid into the sealed chamber.

13. An electric motor and damping module for use with a transmission, the electric motor and damping module comprising:
   an input member;
   an output member;
   an electric motor having a stator and a rotor;
   a bell housing surrounding the electric motor, and wherein the stator of the electric motor is fixed to the bell housing;
   an electric motor damper having an input and output, the input of the electric motor damper is continuously interconnected with the rotor of the electric motor and the output of the electric motor damper is continuously connected with the output member of the electric motor and damping module;
   a disconnect clutch having an input and an output, and wherein the input of the disconnect clutch is continuously interconnected with the input member of the electric motor and damping module and the output of the disconnect clutch is continuously interconnected with the rotor;
   a one-way clutch having an input and an output, and wherein the input of the one-way clutch is continuously interconnected with the input member of the electric motor and damping module and the output of the one-way clutch is continuously interconnected with the output member of the electric motor and damping module;
   a hydraulic pump having an input member, and wherein the input member of the hydraulic pump is continuously interconnected with the output member of the damping module; and
   a sealing assembly having a seal and an end plate, and wherein the sealing assembly, the bell housing, the hydraulic pump, and a transmission case member cooperate to define a sealed chamber and the electric motor, the disconnect clutch, and the electric motor damper being sealed within the sealed chamber to allow the electric motor to be cooled by a hydraulic fluid; and
   wherein the output member of the electric motor and damping module is continuously interconnected with an input member of a planetary transmission.

14. The electric motor and damping module of claim 13 further comprising an engine damper having an input and an output, and wherein the input of the engine damper is continuously interconnected with an engine output and the output of the engine damper is continuously interconnected with the input of the damping module.

15. The electric motor and damping module of claim 14 wherein the electric motor, the engine damper, and the motor damper are disposed inside the bell housing.

16. The electric motor and damping module of claim 15 wherein the bell housing includes a bell housing wall defining an interior cavity and the hydraulic pump is at least partially located within the interior cavity of the bell housing.

17. The electric motor and damping module of claim 16 wherein the end plate of the sealing assembly includes a circumferential cooling oil distribution plenum for receiving pressurized oil from the hydraulic pump and communicating the pressurized oil into the sealed chamber.

* * * * *